US005790362A

United States Patent [19]

Kasahara et al.

[11] Patent Number: 5,790,362

[45] Date of Patent: Aug. 4, 1998

[54] LIGHTNING ARRESTER

[75] Inventors: Masataka Kasahara; Kesayuki Takeuchi, both of Nagano, Japan

[73] Assignee: Shinko Electric Industries Co., Ltd., Nagano, Japan

[21] Appl. No.: 736,736

[22] Filed: Oct. 25, 1996

[30] Foreign Application Priority Data

Oct. 26, 1995 [JP] Japan .................................... 7-278670

[51] Int. Cl.[6] ........................................................ H02H 1/00

[52] U.S. Cl. ........................... 361/117; 361/111; 361/119; 361/120

[58] Field of Search ................................ 361/56, 91, 111, 361/117, 118, 119, 127, 120

[56] References Cited

U.S. PATENT DOCUMENTS

| | | | |
|---|---|---|---|
| 4,509,090 | 4/1985 | Kawanami et al. | 361/119 |
| 4,616,155 | 10/1986 | Guichard | 313/573 |

FOREIGN PATENT DOCUMENTS

| | | | |
|---|---|---|---|
| 2 549 650 | 1/1985 | France | H01T 4/12 |
| 32 12 684 | 10/1983 | Germany | H01R 17/12 |
| 38 35 921 | 4/1990 | Germany | H01T 4/00 |
| 58-225585 | 12/1983 | Japan | H01T 3/00 |
| 2 122 807 | 1/1984 | United Kingdom | H01J 17/38 |
| 2 200 243 | 7/1988 | United Kingdom | H01J 17/30 |
| 95/21481 | 8/1995 | WIPO | H01T 4/12 |

*Primary Examiner*—Jeffrey A. Gaffin
*Assistant Examiner*—Stephen Jackson
*Attorney, Agent, or Firm*—Staas & Halsey

[57] ABSTRACT

A lighting arrester of a simple structure facilitates connection of same to a coaxial cable or the like, affording reduced connection costs while providing, optionally, fail-safe and vent-safe functions. A central electrode of the light arrester has a discharging section and a pair of lead terminals extending from opposite ends of the discharging section, each for connection to a signal line. A tubular outer electrode, for connection to an earth line, has an interior space accommodating the central electrode therein. A pair of insulating holders are received at opposite ends of the tubular electrode and the lead terminals extend through and are held thereby for positioning the central electrode within the interior space of the outer electrode, isolating the discharging section from the inner circumference of the outer electrode by a predetermined gap therebetween, the terminals extending outwardly from the outer surfaces of the respective insulating holders.

26 Claims, 6 Drawing Sheets

LIGHTNING ARRESTER

BACKGROUND OF THE INVENTION

1. Field of the Invention

The present invention relates to a lightning arrester.

A lightning arrester has two electrodes fixed near each other, with a gap therebetween, via an insulator, so that a discharge can occur from one electrode, on which a high voltage is applied, to the other electrode. The lightning arrester is used in a communication circuit in such a manner that one electrode are connected to a signal line and the other electrode is connected to a ground line. The connection of the lightning arrester is carried out via terminals such as lead pins on the arrester itself, or the arrester is built into a connector so that terminals of the connector are connected to electrodes of the arrester. If a lightning strike generates a high voltage surge current, it reaches one electrode of the arrester via a signal line connected thereto, and is discharged to the other electrode, across a gap, from the one electrode and escapes to the ground through a ground line. Thereby, the surge current is prevented from being output from the signal line, so that an electronic device connected to the communication circuit is protected.

2. Description of the Related Art

FIG. 15 illustrates one embodiment of a connector in which a conventional lightning arrester is built-in (as disclosed in Japanese Unexamined Patent Publication No. 58-225585 corresponding to U.S. Pat. No. 4,509,090).

Reference numeral 50 denotes a lightning arrester wherein electrodes 54, 55 are fixed at opposite ends of a tubular insulator 52 so that a predetermined gap A is provided between the electrodes 54, 55. An inert gas such as argon is filled in the tubular insulator 52.

Reference numeral 56 denotes an inner conductor having terminals at opposite ends thereof to be connected to a signal line of a coaxial cable type. Reference numeral 58 denotes an outer conductor having threaded portions at opposite ends thereof to be connected to a ground line. The inner conductor 56 is supported, by an insulator 60, to be positioned in the interior of the outer conductor 58.

The lightning arrester 50 is inserted into a tubular bore 58*a* provided in a side wall of the outer conductor 58 so that the one electrode 54 is fitted into a recess 56*a* in the inner conductor 56. A conductive spring member 62 abuts at one end thereof to the other electrode 55, and a conductive threaded cap 64 abutting to the other end of the conductive spring member 62 is screwed into the tubular bore 58*a*, whereby the lightning arrester 50 is built into the connector. According to a biasing force of the conductive spring member 62, the lightning arrester 50 is secured in the tubular bore 58*a*, and the one electrode 54 is connected to the inner conductor 56, while the other electrode 55 is connected to the outer conductor 58 via the conductive spring member 62 and the conductive threaded cap 64.

Communication lines such as telephone lines have been popularly protected from surge currents by protection elements such as lightning arresters. At present, however, such a protection has not been sufficiently introduced into coaxial cables for CATV or others, compared with the spread of CATV.

This is because the connection of the conventional lightning arrester 50 to the coaxial cable is troublesome and thus expensive. To solve such a problem, the lightning arrester 50 is preferably built into the connector as described above to facilitate the connection to the coaxial cable. However, it is necessary, for building the lightning arrester 50 into the connector, to provide the tubular bore 58*a* in the side wall of the connector, which complicates the structure of the connector and increases the cost thereof, resulting in an increase in the connection cost.

Also, according to the structure of the conventional lightning arrester, there is a problem in that it is difficult to provide a fail-safe function for protecting an electronic device by realizing a short-circuiting state when the heat is generated due to a dynamic current or others.

Further, according to the structure of the conventional lightning arrester, there is another problem in that it is difficult to provide a vent-safe function, as a backup means, for causing a discharge through a gap formed outside the lightning arrester when a primary discharge becomes impossible due to a leakage or others (for example, when the inert gas in the lightning arrester is dispersed for some reason) when an external surge voltage is applied to the lightning arrester.

Accordingly, an object of the present invention is to provide a lightning arrester which is simple in structure, capable of being readily connected to a coaxial cable to reduce the connection cost and easily provides a fail-safe function and a vent-safe function.

SUMMARY OF THE INVENTION

To achieve the above object, the present invention provides a lightning arrester comprising a central electrode having a discharging section and a pair of lead terminals to be connected to a signal line, extending outside from opposite ends of the discharging section, a tubular outer electrode, to be connected to an earth line, having an interior space for accommodating the central electrode therein and a pair of insulating holders arranged on the lead terminals extending from the opposite ends of the discharging section, respectively, so that the central electrode is held in the interior space of the outer electrode while isolating the discharging section from the inner surface of the outer electrode at a predetermined gap therebetween.

An outer diameter of the lead terminal of the central electrode is smaller than that of the discharging section, whereby a discharging gap is suitably provided.

The insulating holder is made of a ceramic material and has a central through-hole wherein an outer peripheral edge of an outside surface of the insulating holder and the peripheral edge of the through-hole are metallized, and the lead terminal of the central electrode passes through the through-hole, and wherein the central electrode is bonded to the metallized section on the peripheral edge of the through-hole and the outer electrode is bonded to the metallized section on the outer peripheral edge of the insulating holder, and the interior space of the outer electrode is filled with an inert gas in a gas-tight manner, whereby a coaxial type lightning arrester is easily produced.

The central electrode is bonded to the metallized section on the peripheral edge of the through-hole and the outer electrode is bonded to the metallized section on the outer peripheral edge of the insulating holder, respectively, by a brazing, whereby the inert gas is tightly sealed and the lightning arrester is easily produced.

A trigger wire electrically connected to the central electrode, and/or electrically connected to the outer electrode, is provided on the inner surface of the insulating holder, whereby the response characteristic of the lightning arrester is improved. It is possible to provide a lightning arrester, having a fail-safe function, comprising a pair of lead terminals of the central electrode projected outward from the outside surface of the insulating holder, an outer edge metallized section provided on the peripheral edge of the outside surface of the insulating holder and electrically connected to the outer electrode, an insulating sheet arranged in contact with the outside surface of the insulating holder including the outer edge metallized section of the insulating holder, a short-circuiting plate arranged in contact with the outside surface of the insulating sheet, for short-circuiting the central electrode to the outer electrode by contact with the outer edge metallized section when the insulating sheet is excessively heated and fused, and a pressure means arranged between the lead terminal and the short-circuiting plate, for electrically connecting the central electrode to the short-circuiting plate and pushing the short-circuiting plate toward the outer edge metallized section.

It is possible to provide a lightning arrester, having a fail-safe function, comprising a pair of lead terminals of the central electrode projected outward from the outside surface of the insulating holder, an outer edge metallized section provided on the peripheral edge of the outside surface of the insulating holder and electrically connected to the outer electrode, a short-circuiting plate arranged on the outside surface of the insulating holder, a pressure means arranged between the lead terminal and the short-circuiting plate, for electrically connecting the central electrode to the short-circuiting plate and pushing the short-circuiting plate toward the outer edge metallized section, a low-melting point metallic plate arranged, between the outer edge metallized section and the short-circuiting plate, to be in contact with one of the outer edge metallized section and the short-circuiting plate, for electrically connecting the short-circuiting plate to the outer edge metallized section when the low-melting point metallic plate is excessively heated and fused so that the central electrode is short-circuited with the outer electrode, and a heat-durable insulating sheet arranged between the low-melting point metallic plate and the short-circuiting plate or between the outer edge metallized section and the low-melting point metallic plate and having a higher melting point than that of the low-melting point metallic plate, for electrically insulating the central electrode from the outer electrode.

It is possible to eliminate the insulating sheet from the lightning arrester, having a fail-safe function, comprising a pair of lead terminals of the central electrode projected outward from the outside surface of the insulating holder, an outer edge metallized section provided on the peripheral edge of the outside surface of the insulating holder and electrically connected to the outer electrode, a short-circuiting plate arranged on the outside surface of the insulating holder, a pressure means arranged between the lead terminal and the short-circuiting plate, for electrically connecting the central electrode to the short-circuiting plate and pushing the short-circuiting plate toward the outer edge metallized section, and a low-melting point metallic plate arranged between the outside surface of the insulating holder on which no outer edge metallized section is provided and the short-circuiting plate, to be in contact with the short-circuiting plate, for electrically connecting the short-circuiting plate to the outer edge metallized section when the low-melting point metallic plate is excessively heated and fused so that the central electrode is short-circuited with the outer electrode.

It is possible to provide a lightning arrester having a vent-safe function by providing a pair of lead terminals of the central electrode projected outward from the outside surface of the insulating holder, an outer edge metallized section provided on the peripheral edge of the outside surface of the insulating holder and electrically connected to the outer electrode, a short-circuiting plate arranged on the outer side of the insulating holder, a pressure means arranged between the lead terminal and the short-circuiting plate, for electrically connecting the central electrode to the short-circuiting plate and pushing the short-circuiting plate toward the outer edge metallized section, and an insulating sheet having a plurality of small holes for allowing the discharge between the outer edge metallized section and the short-circuiting plate when a voltage of a predetermined level or more is applied.

It is possible to maintain a constant gap between the discharging surface and the discharged surface and improve the reliability by disposing conductive plates between the insulating sheet and the outer edge metallized section and between the insulating sheet and the short-circuiting plate, respectively.

It is possible to provide a lightning arrester having both the fail-safe function and the vent-safe function by constituting at least one of the conductive plates from a low-melting point metallic plate which can be fused, when excessively heated, to flow into the small holes and electrically connect the short-circuiting plate to the outer edge metallized section so that the central electrode is short-circuited to the outer electrode.

It is possible to obtain the preferable fail-safe function by forming the low-melting point metallic plate with a solder.

It is possible to simplify a structure and reduce the production cost by constituting the pressure means by a blade spring provided in the short-circuiting plate itself to be engaged with the lead terminal of the central electrode, for pushing the short-circuiting plate toward the outer edge metallized section.

It is possible to suitably arrange the insulating holder by abutting the insulating holder to a shoulder of a stepped section having a larger inner diameter provided at the respective end of the outer electrode, so that the insulating plate is fitted to the end of the outer electrode.

It is possible to guarantee the gas-tightness by providing a metallized section on the peripheral surface of the insulating holder and bonding the same to the inner circumference of the outer electrode by a brazing.

It is possible to obtain a lightning arrester having a fail-safe function by providing a smaller diameter section in at least one of the lead terminals of the discharging section, to be fused down when excessively heated.

BRIEF DESCRIPTION OF THE DRAWINGS

These and other objects of the present invention will become apparent from the following detailed description of the preferred embodiment of the invention, taken in connection with the accompanying drawings.

In the drawings.

DESCRIPTION OF THE PREFERRED EMBODIMENTS

The preferred embodiments of the present invention will be described below in detail with reference to the attached drawings.

First Embodiment

Figure 1:
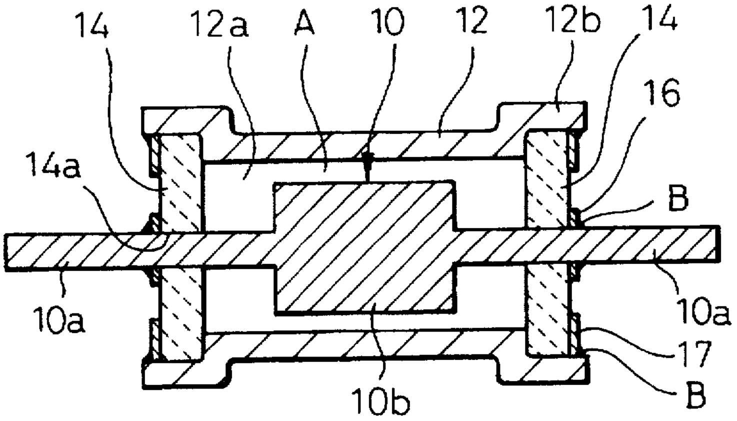
FIG. 1 is a side sectional view of a first embodiment of the present invention.
Figure 2:
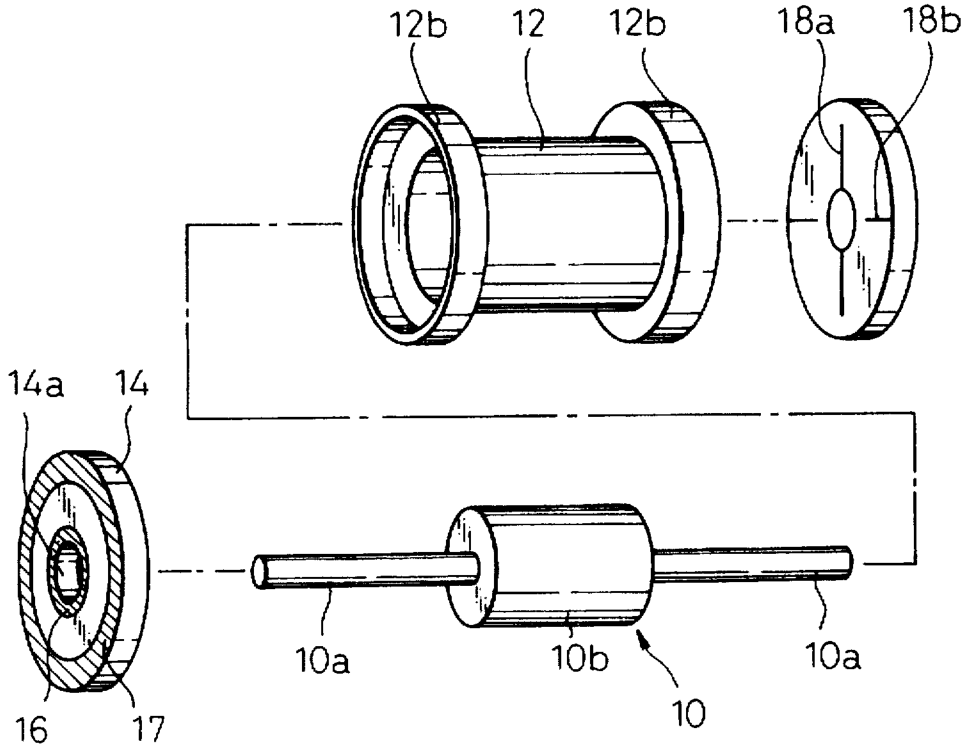
FIG. 2 is an exploded view of the first embodiment.

FIG. 1 is a side sectional view of a first embodiment of a lightning arrester according to the present invention, and FIG. 2 is an exploded view of the first embodiment. This embodiment is an example of the lightning arrester used for a coaxial cable.

Reference numeral 10 denotes a central electrode having a discharging section 10b and a pair of lead terminals 10a extending from the opposite ends (lateral surfaces) of the discharging section, to be connected to a central core of a coaxial cable used as a communication line.

Reference numeral 12 denotes a tubular outer electrode having an interior space 12a through which the central electrode 10 is inserted, to be connected to an earth line of the coaxial cable.

The outer electrode 12 is easily produced by cutting a pipe, available from a market, and shaping the same so that a stepped section 12b having a larger inner diameter is provided at each of the respective opposite ends of the outer electrode by a press operation.

A material used for forming the central electrode 10 and the outer electrode 12 is, for example, a Fe/Ni alloy.

Reference numeral 14 denotes each of two insulating holders arranged on the respective opposite lead terminals 10a (provided at the respective opposite ends of the outer electrode 12), so that the discharging section 10b is spaced from the inner surface of the outer electrode 12 at a predetermined distance. In other words, the central electrode 10 is held in the outer electrode 12 so that an annular discharging gap A is provided between the inner and outer electrodes 10 and 12. According to this embodiment, each insulating holder 14 abuts a shoulder of the stepped section 12b and is fitted into the respective end of the outer electrode 12 so that the central electrode 10 and the outer electrode 12 are coaxially arranged with each other.

In the drawing, the discharging section 10b, positioned in a middle area of the central electrode 10 inserted into the outer electrode 12, has a larger diameter than that of the lead terminal. The central electrode of such a configuration may be prepared from a cylindrical metallic rod by machining a portion thereof corresponding to the lead terminal by using a lathe or other tool. Alternatively, a lengthwise middle portion of a wire piece is deformed in a radial direction by a press to form a widened discharging section 10b of the central electrode 10. Thus, the lightning arrester is formed, wherein the discharging section 10b is spaced apart from the inner circumference of the outer electrode 12 at the discharging gap A and the outer diameter of the lead terminal 10a is smaller than the outer diameter of the discharging section 10b.

Each insulating holder 14 is formed of a ceramic material in a disk shape having a central through-hole 14a. Into this hole 14a, the respective lead terminal 10a of the central electrode is inserted whereby the central electrode 10 is held by the insulating holders 14. The peripheral edge of the through-hole and the outer edge of the insulating holder on the outside surface of the insulating holder are metallized. The lead terminals 10a of the central electrode are bonded to the metallized sections 16 on the peripheral edges of the respective through-holes by a brazing B (see FIG. 1), while opposite ends of the outer electrode 12 are connected to the metallized sections 17 on the outer peripheral edge edges of the respective holders 14, so that the respective opposite ends of the central electrode 12 are electrically connected to the respective metallized sections 17. Accordingly, it is possible to gas-tightly seal an inert gas such as argon within the interior space 12a. Tungsten may be used for the metallization, and silver solder may be used for the brazing. In this regard, preferably, the metallized sections are preliminarily applied with a nickel or gold plating.

A method for obtaining gas-tightness is not limited to that wherein the metallized section is provided in the above manner and brazed. For example, a metallized section may be provided on the outer circumference of the insulating holder 14 and brazed to the inner circumference of the outer electrode 12. Also, a metallized section may be provided on the outer edge of the inside surface of the insulating holder 14 and brazed to the shoulder of the stepped portion 12b to obtain the favorable gas-tightness. Thus, since the lightning arrester is constituted as described above, it is possible to provide an outer plating, for the purpose of preventing corrosion, all over the metallic surface of the outer circumference of the lightning arrester except for the ceramic surface of the insulating holder 14.

Carbon lines 18a, 18b (FIG. 2) are radially provided, as trigger means, on the inside surface of the insulating holder 14. The carbon line 18a is electrically connected to the central electrode 10, while the carbon line 18b is electrically connected to the outer electrode 12. The carbon lines 18a, 18b operate as the trigger means for inducing the discharge and improve the response characteristic of the lightning arrester.

In this regard, although the carbon lines 18a and 18b are radially arranged one by one in an alternate manner in the illustrated embodiment, a plurality of carbon lines may be grouped and/or arranged in a manner other than the radial arrangement, in accordance with the circumstances under which the arrester is used or conveniences of design.

Such a structure is applicable to the lightning arrester capable of suitably selecting a clamp voltage in a range between several tens of volts and several thousands of volts (for example, 70V to 3000V).

According to the arrester of the first embodiment, the central electrode 10 is provided at the opposite ends thereof with the lead terminals 10a projecting outwardly from the outside surfaces of the respective insulating holders 14, and the outer electrode 12 defines an earth electrode surface over all of the outer circumference thereof. That is, this arrester has a similar structure as a coaxial cable. Therefore, this arrester can be easily connected in series to a coaxial cable by using a connector generally used for connecting coaxial cables to each other.

Also, a coaxial cable connector in which a lightning arrester is built-in can be easily obtained by coupling connectors used for generally connecting the coaxial cables to each other to the opposite ends of the lightning arrester according to the first embodiment. Thus, there is no need for an exclusive connector for the lightning arrester, which enables the use of the same parts as the general-purpose connector, resulting in a cost reduction.

Further, since the earth electrode surface is provided by the whole outer circumference of the outer electrode 12, parts necessary for the connection with outer circuits can be designed with a larger degree of freedom, which also enables the arrester to be applied to uses other than the coaxial cable.

Second Embodiment

Figure 3:
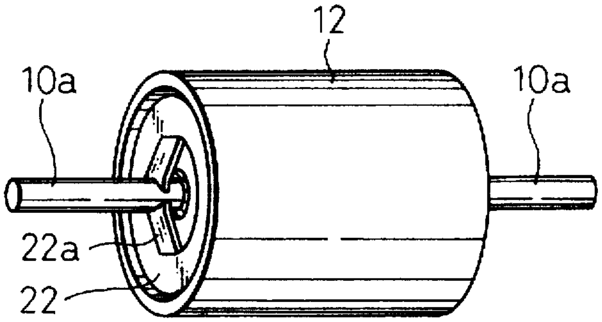
FIG. 3 is a perspective view of an appearance of a second embodiment of the present invention.
Figure 4:
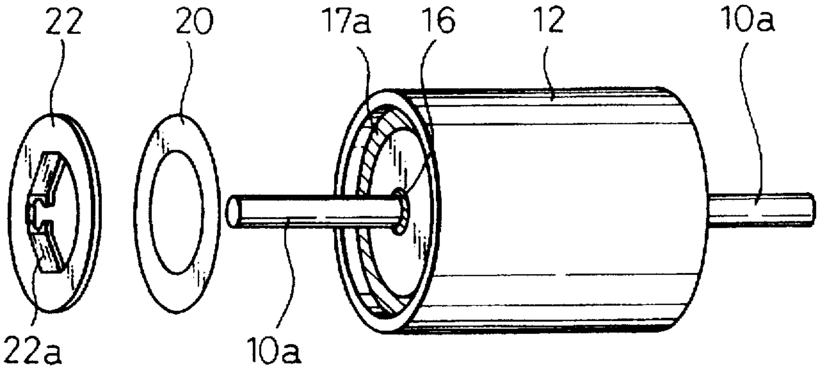
FIG. 4 is an exploded view of the second embodiment.
Figure 5:
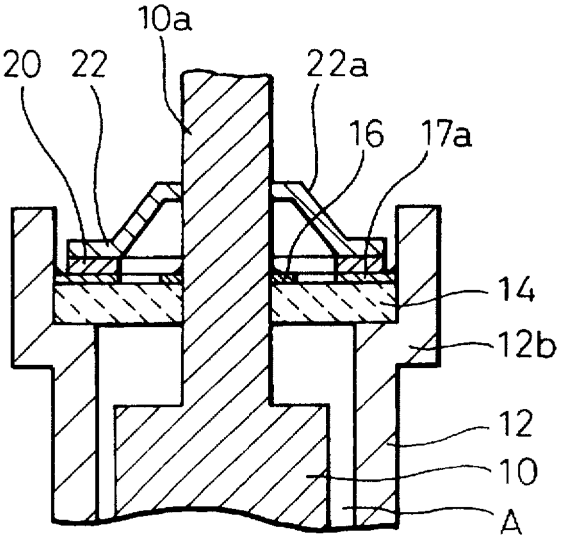
FIG. 5 is a side sectional view of the second embodiment.

A second embodiment will be described with reference to FIGS. 3, 4 and 5.

The same reference numerals are used in these drawings for denoting the same elements as those in the first embodiment and the description thereof will be eliminated. In this regard, while an outer electrode 12 is illustrated in a mere cylindrical form, it may be concave in the middle portion similarly to the first embodiment.

Reference numeral 10*a* denotes a lead terminal of a central electrode 10, shaped to be of a shaft-like form and projected outwardly from the outside surface of a insulating holder 14 for supporting the central electrode 10.

Reference numeral 17*a* denotes an outer edge metallized section provided for connection to the outer electrode 12, on the outer edge of the outside surface of the insulating holder 14 by the metallization of tungsten or the like. The insulating holder 14 is a disk having a flat outside surface. In the second embodiment, the outer edge metallized section 17*a* is substantially the same as that section 17 in the first embodiment and bonded to the outer electrode 12 by brazing B in a similar manner as the first embodiment. In this regard, if the metallized section is provided on the outer circumference of the insulating holder 14 and brazed to the inner circumference of the outer electrode 12 to provide gas-tightness as described before, it is unnecessary to provide the outer edge metallized section 17*a* along the entire peripheral edge of the outside surface of the insulating holder 14.

Reference numeral 20 denotes an insulating sheet of an annular shape, provided to be in contact with the outside surface of the insulating holder 14 including the outer edge metallized section 17*a*. As shown in FIG. 5, the lead terminal 10 of the central electrode 10*a* is inserted into a central hole of the insulating sheet 20. The insulating sheet 20 has an outer diameter smaller than an inner diameter of the outer electrode 12, and is disposed in contact with the outside surface of the insulating holder 14.

The insulating sheet 20 may be a resin film having an electro-insulating property as well as thermoplasticity. One example thereof is a polyester film having a thickness in a range between 50 μm and 100 μm.

Reference numeral 22 denotes a short-circuiting plate disposed to be in contact with the outside surface of the insulating sheet 20 and connected to the central electrode 10 via the lead terminal 10*a*. The short-circuiting plate 22 is pressed toward the outer edge metallized section 17*a* by a pressure means described later. The short-circuiting plate 22 is movable in the pressure direction, when the insulating sheet 20 is excessively heated and fused, to be in contact with the outer edge metallized section 17*a* so that the central electrode 10 and the outer electrode 12 are short-circuited to each other.

Reference numeral 22*a* denotes a blade spring used as the pressure means. The blade spring 22*a* is provided integral with the short-circuiting plate 22 and engaged with the lead terminal 10*a* of the central electrode at one end to bias the short-circuiting plate 22 toward the outer edge metallized section 17*a*. Specifically, as shown in the drawing, the blade spring 22*a* extends inwardly at a predetermined angle from the inner peripheral edge of the short-circuiting plate 22, and has a tip end with a V-shaped notch to be engaged with the lead terminal 10*a* of the central electrode. The short-circuiting plate 22 having the blade spring 22*a* integral therewith is formed of a spring material. Therefore, the insulating sheet 20 is secured, by a biasing force of the blade spring 22*a*, at a suitable position while being nipped (i.e., pressed or pinched) between the outer edge metallized section 17*a* and the short-circuiting plate 22, whereby a fail-safe mechanism is obtained.

The fail-safe mechanism is provided at one end of the lightning arrester in the second embodiment, but it should be noted that such mechanisms may be provided at both ends of the lightning arrester.

According to the second embodiment, when the lightning arrester is excessively heated by repeated discharges, the insulating sheet 20 fuses due to the heat generation of the arrester body. Then the short-circuiting plate 22 pressed toward the outer edge metallized section 17*a* by the blade spring 22*a* pushes the fused insulating sheet 20 aside and is in contact with the outer edge metallized section 17*a*, resulting in a fail-short state.

As stated above, according to the second embodiment, it is possible to provide a fail-safe function by a simple structure. Particularly, the short-circuiting plate 22 operates not only as a conductive plate for short-circuiting the central electrode with the outer electrode but also as a pressure means for biasing itself toward the outer edge metallized section by providing the blade spring 22*a*. Accordingly, the structure thereof is simplified and the mounting of the short-circuiting plate 22 can be completed only by press-fitting the same to the lead terminal 10*a* of the central electrode, resulting in the reduction of the production cost.

The short-circuiting plate 22 may be prepared, for example, from phosphor bronze or stainless steel. The pressure means is not limited to the blade spring 22*a* but may be any other elastic members provided it could be interposed between the lead terminal 10*a* of the central electrode and the short-circuiting plate 22, such as a coil spring.

Third Embodiment

Figure 6:
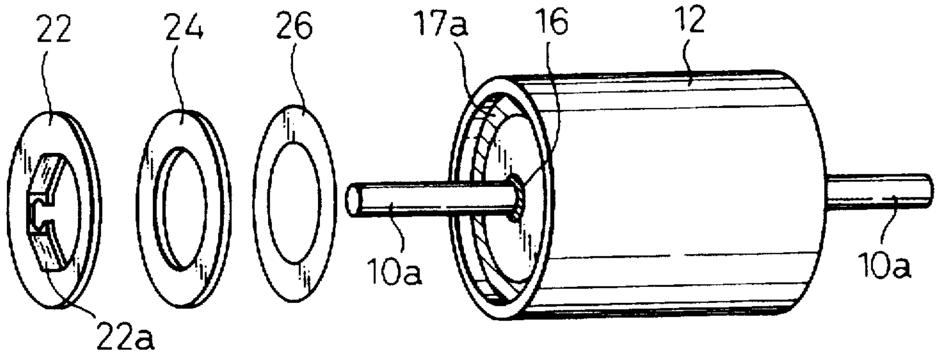
FIG. 6 is an exploded view of a third embodiment of the present invention.

A third embodiment will be described with reference to FIG. 6.

The same reference numerals are used in this drawing for denoting the same elements as those in the second embodiment and the description thereof will be eliminated.

Reference numeral 24 denotes a low-melting point metallic plate of an annular shape having a central hole to which a lead terminal 10*a* is inserted, and to be disposed between an outer edge metallized section 17*a* and a short-circuiting plate 22. The low-melting point metallic plate is prepared, for example, from a solder. Preferably, the solder has a melting point in a range between 180° and 220° C. In this regard, since the deformation may occur in the low-melting point metallic plate made of an ordinary solder due to a creep phenomenon caused by a biasing force of a blade spring 22*a*, silver is preferably added to the solder (tin/lead alloy) to increase the hardness thereof. Also, tin having substantially the same melting point as the solder may be used for preparing the low-melting point metallic plate.

Reference numeral 26 denotes an insulating sheet 26 having a shape similar to the low-melting point metallic plate 24 and disposed between the low-melting point metallic plate 24 and the outer edge metallized section 17*a*. The insulating sheet 26 is a heat-resistant sheet having a thickness in a range between 50 μm and 100 μm, prepared, for example, from polyimide resin. Aromatic polyimides having a pyrolysis temperature of 400° C. and a thermal deformation temperature of 360° C. can be used as the polyimide resin. Also, insulating films prepared from heat-resistant resins, such as polyamideimide, polyether-imide, having a higher thermal deformation temperature than that of the low-melting point metallic plate may be used for this purpose. Inorganic materials such as mica may be also used.

According to the third embodiment, when the low-melting point metallic plate 24 is fused by excessive heat due, for example, to repeated discharges in the lightning arrester, the short-circuiting plate 22 biased toward the outer edge metallized section 17*a* by the blade spring 22*a* pushes the fused portion of the low-melting point metallic plate 24 forward. The fused metal pushed forward by the short-circuiting plate 22 is brought into contact with the outer edge metallized section 17*a* and/or the end of the outer electrode 12, and, as a result, the central electrode 10 is short-circuited to the outer electrode 12. In this regard, if there is a solder plating layer on the short-circuiting plate 22, the outer edge metallized section 17*a* and the outer electrode 12, the connection therebetween is further ensured in a case that the low-melting point metal is made of a solder.

As described above, according to the third embodiment, a fail-safe mechanism is suitably obtainable.

Even when the insulating sheet 26 is provided between the low-melting point metallic plate 24 and the short-circuiting plate 22, but not between the low-melting point metallic plate 24 and the outer edge metallized section 17*a*, the fail-safe mechanism is similarly obtainable as in the third embodiment. According to the latter structure, since the low-melting point metallic plate 24 is directly brought into contact with the outside surface of the insulating holder defining the lateral surface of the lightning arrester, the heat in the arrester can be effectively transmitted thereto. Also, the low-melting point metallic plate 24 is in contact with the outer edge metallized section 17*a*, and the low-melting point metal pushed forward by the short-circuiting plate 22 is brought into contact with the metallized section 16 on the peripheral edge of the through-hole and the lead terminal 10*a* of the central electrode to result in that the central electrode 10 is short-circuited with the outer electrode 12. In this regard, the connection between the respective elements is further enhanced by providing a solder plating thereto, as shown in the third embodiment.

Fourth Embodiment

Figure 7:
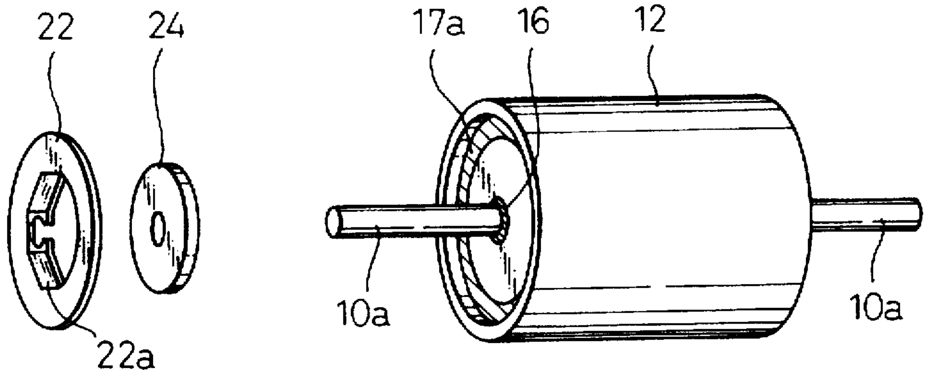
FIG. 7 is an exploded view of a fourth embodiment of the present invention.
Figure 8:
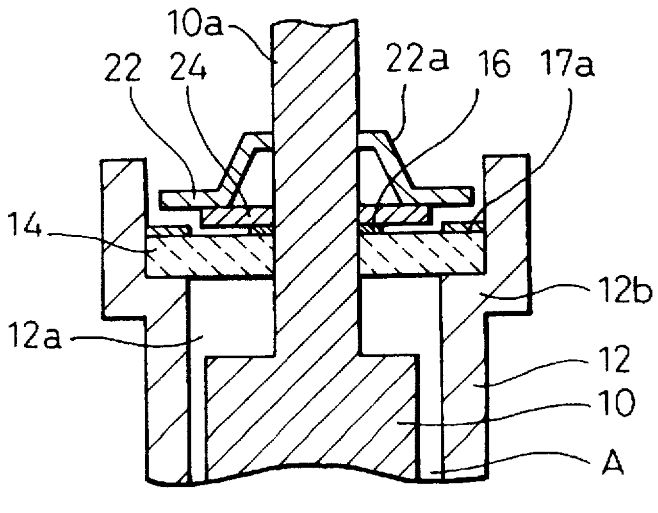
FIG. 8 is a side sectional view of the fourth embodiment.

A fourth embodiment will be described with reference to FIGS. 7 and 8.

The same reference numerals are used in this drawing for denoting the same elements as those in the second embodiment and the description thereof will be eliminated.

A low-melting point metallic plate 24 is fused when the arrester body is excessively heated as described before. Then a short-circuiting plate 22 biased toward an outer edge metallized section 17*a* by a blade spring 22*a* pushes the fused portion of the low-melting point metallic plate 24 forward. The fused low-melting point metal pushed by the short-circuiting plate 22 is brought into contact with the outer edge metallized section 17*a* to short-circuit the central electrode 10 with the outer electrode 12. Or, by properly selecting a thickness of the low-melting point metallic plate 24 or a configuration of the outside surface of the insulating holder 14, it is also possible to bring the short-circuiting plate 22 into contact with the outer edge metallized section 17*a* to short-circuit the central electrode 10 with the outer electrode 12 due to the reduction of the thickness of the low-melting point metallic plate 24 caused by the fusion thereof. According to such a structure, it is also possible to provide a fail-safe function to the lightning arrester. Since the insulating sheet 26 can be eliminated in this structure, the production cost can be further reduced.

Fifth Embodiment

Figure 9:
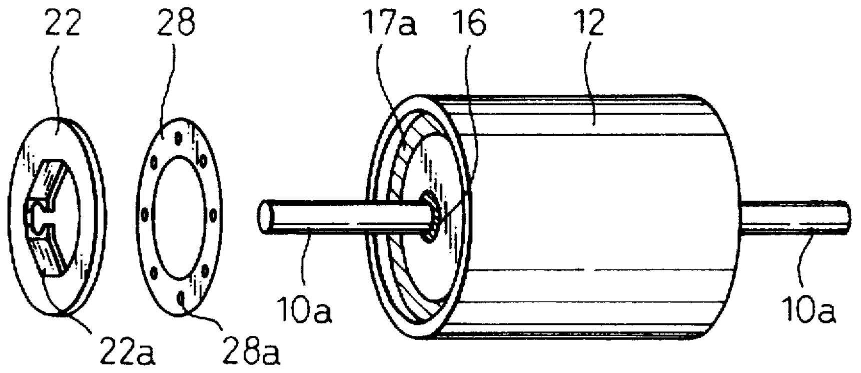
FIG. 9 is an exploded view of a fifth embodiment of the present invention.

A fifth embodiment will be described with reference to FIG. 9.

The same reference numerals are used in this drawing for denoting the same elements as those in the second embodiment and the description thereof will be eliminated.

Reference numeral 28 denotes an insulating sheet disposed between an outer edge metallized section 17*a* and a short-circuiting plate 22 while being brought into contact with both. A plurality of small holes 28*a* for allowing the discharge between the outer edge metallized section 17*a* and the short-circuiting plate 22 when a voltage higher than a predetermined level is applied. The thickness of the insulating plate is preferably in a range between 50 μm and 100 μm, and a diameter of the small hole 28*a* is preferably in a range between 0.2 mm and 0.3 mm. Materials used for preparing the insulating plate 28 may be the same as those used in the third embodiment.

According to this structure, a vent-safe mechanism is provided, wherein a discharge can occur via a discharging gap formed by the small holes 28*a* between the short-circuiting plate 22 and the outer edge metallized section 17*a*, even if the discharge cannot occur in the arrester body.

The vent-safe mechanism is simple in structure because the insulating sheet 28 and the short-circuiting plate 22 are merely overlapped with the outside surface of the insulating holder 14, resulting in a reduction in the production cost.

Sixth Embodiment

Figure 10:
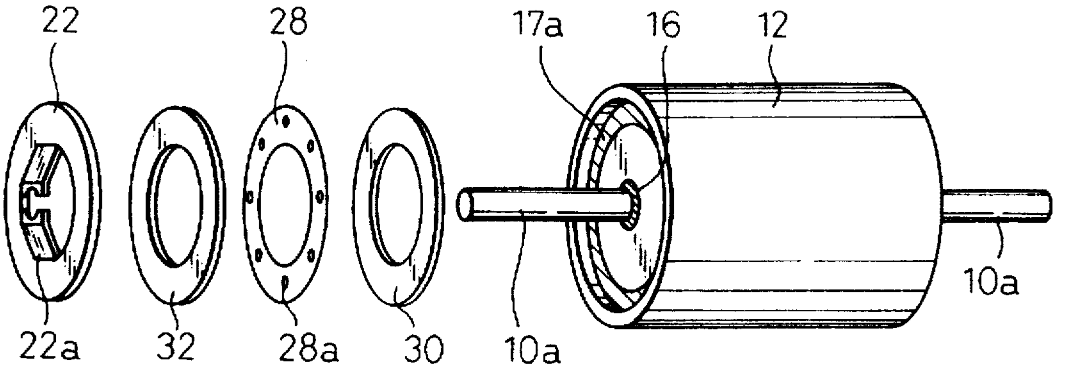
FIG. 10 is an exploded view of a sixth embodiment of the present invention.
Figure 11:
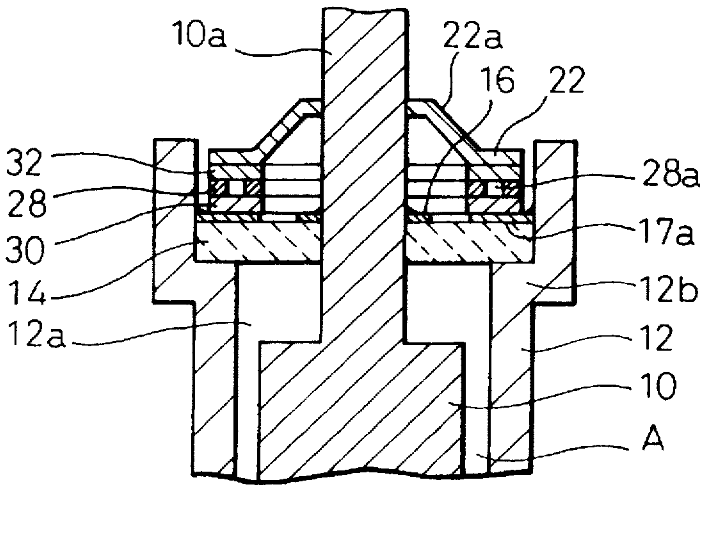
FIG. 11 is a side sectional view of the sixth embodiment.

A sixth embodiment will be described with reference to FIGS. 10 and 11.

The same reference numerals are used in this drawing for denoting the same elements as those in the fifth embodiment and the description thereof will be eliminated.

A metallic plate 30 is disposed as a conductor plate between an insulating sheet 28 and an outer edge metallized section 17*a*, and another metallic plate 32 is disposed as a conductor plate between the insulating sheet 28 and a short-circuiting plate 22. By providing the metallic plates 30, 32 (annular disks) on the opposite sides of the insulating sheet 28, it is possible to minimize the variation of discharge gaps formed by the plurality of small holes 28*a* and stabilize a discharging voltage upon the vent-safe operation.

If at least one of the metallic plates is formed of a low-melting point metal, a fail-safe function can be provided. The low-melting point metal flows through the small holes when fused, to electrically connect the outer edge metallized section 17*a* to the short-circuiting plate 22 and short-circuit the central electrode to the outer electrode.

Seventh Embodiment

Figure 12:
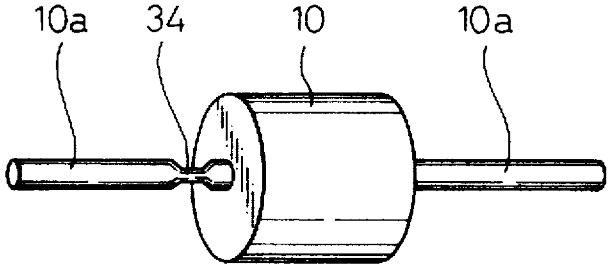
FIG. 12 is a perspective view of a central electrode of a seventh embodiment of the present invention.
Figure 13:
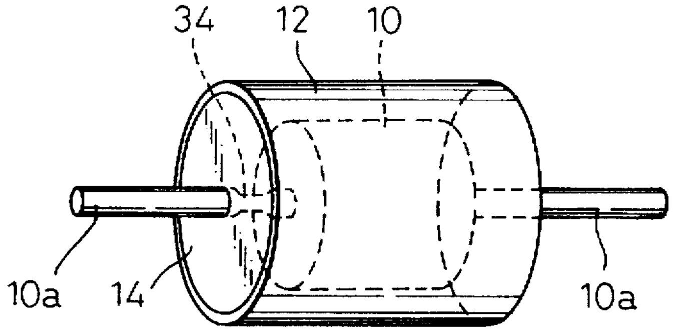
FIG. 13 is a perspective view of the seventh embodiment of the present invention in an assembled state.

A seventh embodiment will be described with reference to FIGS. 12 and 13.

The same reference numerals are used in this drawing for denoting the same elements as those in the second embodiment and the description thereof will be eliminated.

A smaller diameter section 34 is provided on a lead terminal 10*a* formed at an end of a discharging section of a central electrode 10, by thinning part of the lead terminal so that it can be fused when excessively heated. The smaller diameter section 34 is disposed within an interior space 12*a* so as not to be broken by an external force. While the smaller diameter section 34 is provided on one of the lead terminals 10*a* of the discharging section in the seventh embodiment, it should be noted that the smaller diameter sections may be provided on the respective lead terminals 10*a* formed on the opposite ends of the discharging section.

According to the lightning arrester of the seventh embodiment, the circuit is made to open by the fusion of the smaller diameter section 34 when a large current such as a dynamic current flows. Thus, a fail-safe function for protecting a device is obtainable by this mechanism.

This fail-safe mechanism is simple in structure and thus a lightning arrester with a fail-safe function can be provided at a low cost.

Figure 14:
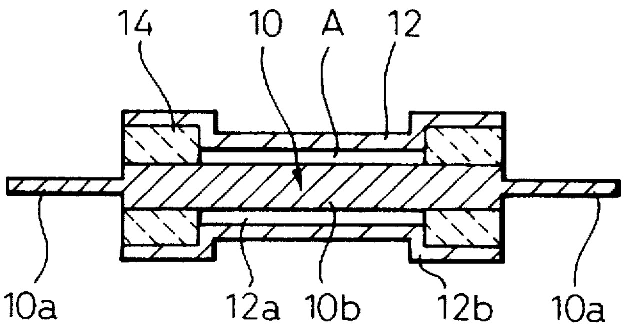
FIG. 14 is a side sectional view for explaining further embodiment of the present invention.
Figure 15:
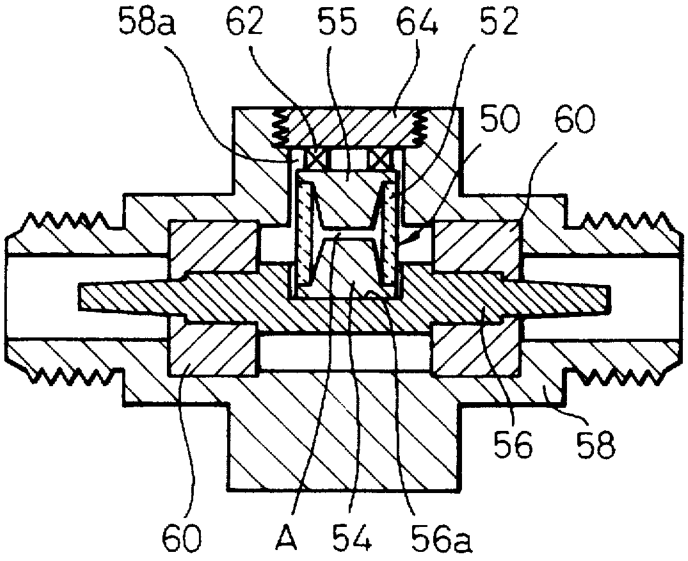
Fig.15 (PRIOR ART)
FIG. 15 is a side sectional view for explaining a prior art.

In the above-mentioned embodiments, an outer diameter of the lead terminal 10*a* of the central electrode is smaller than that of the discharging section 10*b* in a portion to be inserted into the insulating holder 14. However, the present invention should not be limited to such cases. For example, as shown in FIG. 14, an outer diameter of the lead terminal 10*a* of the central electrode may be equal to that of the discharging section 10*b* even in a portion to be inserted into the insulating holder 14.

If a structure to which the lightning arrester is built-in allows, the arrester may have a configuration wherein the lead terminal 10*a* of the central electrode is not projected outward from the outside surface of the insulating holder 14.

The above description was made when the lightning arresters of the respective embodiments are used for coaxial cables. However, it should be noted that the lightning arresters according to the present invention may be used for cables of other types.

While cylindrical arresters are solely illustrated in the drawings of the above embodiments, the appearance of the arrester may be angular, provided there is a tubular interior space in at least one of electrodes.

Also, the lightning arresters of the third to sixth embodiments may have a short-circuiting plate at the respective opposite ends thereof, as described with reference to the second embodiment, so that a fail-safe function and/or a vent-safe function are provided.

The present invention was described in detail above with reference to the preferred embodiments. The present invention should not be limited to these embodiments but includes various changes and modifications which do not constitute a departure from the spirit and scope of the present invention.

In the lightning arrester according to the present invention, since a central electrode is positioned in the interior space of an outer electrode, it is possible to simplify the structure of the arrester and facilitate the operation for connecting the same with a coaxial cable or the like. Accordingly, the production cost and the connection cost can be reduced.

Also, the fail-safe function and the vent-safe function can be easily provided by using a lead terminal of a central electrode and the outside surface of an insulating holder for supporting a central electrode in an outer electrode.

It is to be understood that the invention is by no means limited to the specific embodiments illustrated and described herein, and that various modifications thereof may be made which come within the scope of the present invention as defined in the appended claims.

We claim:

1. A lightning arrester comprising:

a central electrode having a discharging section and a pair of lead terminals extending outwardly from respective, opposite ends of the discharging section for connection to a signal line, an outer diameter of each lead terminal of the central electrode being smaller than that of the discharging section;

a tubular outer electrode for connection to an earth line and having opposite ends and defining an interior space accommodating the central electrode therein;

a pair of insulating holders, each insulating holder being made of a ceramic material and having a central through-hole therein, an outer peripheral edge of an outside surface thereof and the peripheral edge of the through-hole thereof being metallized; and the pair of lead terminals of the central electrode passing through the corresponding through-holes of the pair of insulating holders, respectively, and being bonded to the metallized section on the peripheral edge of the corresponding through-holes, the pair of opposite ends of the outer electrode being bonded to the corresponding metallized sections on the outer peripheral edges of the pair of insulating holders, respectively, and the interior space of the outer electrode being filled with an inert gas in a gas-tight manner.

2. The lightning arrester as defined by claim 1, wherein the central electrode is bonded, at the pair of lead terminals thereof, to the metallized sections on the peripheral edges of the corresponding through-holes of the pair of insulating holders, respectively, and the outer electrodes are bonded to the metallized sections on the outer peripheral edges of the insulating holders, respectively, by brazing.

3. The lightning arrester as defined by claim 1, further comprising a trigger wire, electrically connected to one of the central electrode and the outer electrode, disposed on an inside surface of one of the pair of insulating holders.

4. The lightning arrester defined by claim 1, wherein each insulating holder abuts a shoulder of a stepped section of a respective end of the tubular outer electrode, the stepped section having a larger inner diameter then the diameter of the respective end of the outer electrode, so that the insulating plate is fitted to the respective end of the outer electrode.

5. The lightning arrester as defined by claim 1, wherein each insulating holder has a metallized section on an outer circumference thereof which is bonded to the inner circumference of the outer electrode by brazing.

6. A lightning arrester, comprising:

a central electrode having a discharging section and a pair of lead terminals extending outwardly from respective, opposite ends of the discharging section for connection to a signal line, an outer diameter of each lead terminal of the central electrode being smaller than that of the discharging section;

a tubular outer electrode for connection to an earth line and having opposite ends and defining an interior space accommodating the central electrode therein;

a pair of insulating holders, the pair of lead terminals of the central electrode receiving therethrough respective lead terminals of the pair of lead terminals of the central electrode and supporting the central electrode in the interior space of the outer electrode and isolating the discharging section from the inner circumference of the outer electrode with a predetermined gap therebetween, the pair of lead terminals projecting outwardly from corresponding outside surfaces of the pair of insulating holders, respectively;

an outer edge metallized section provided on a peripheral edge of the outside surface of a selected insulating holder and electrically connected to the outer electrode;

an insulating sheet, arranged in contact with the outside surface of the selected insulating holder including the outer edge metallized section thereof;

a short-circuiting plate, in contact with the outside surface of the insulating sheet, short- circuiting the respective lead terminal of the central electrode to the outer electrode by the contact with the outer edge metallized section upon the insulating sheet being excessively heated and fused; and a pressure imposing element, disposed between the lead terminal and the short-circuiting plate, electrically connecting the central electrode to the short-circuiting plate and forcing the short-circuiting plate toward the outer edge metallized section of the selected insulating holder.

7. The lightning arrester as defined by claim 6, wherein the pressure creating element is a blade spring, provided in the short-circuiting plate and engaged with a corresponding lead terminal of the central electrode, forcing the short-circuiting plate toward the outer edge metallized section of the selected insulating holder.

8. The lighting arrester as defined by claim 6, wherein respective outer edge metallized sections are provided on the corresponding peripheral edges of the outside surfaces of said pair of insulating holders and further comprising:

respective insulating sheets, arranged in contact with the respective outer surfaces of the pair of insulating holders including the respective outer edge metallized sections thereof;

respective short-circuiting plates, in contact with the corresponding outer surfaces of the respective insulating sheets, short-circuiting the respective lead terminals of said central electrode to the outer electrode by contact with the outer edge metallized sections thereof upon the corresponding insulating sheets being excessively heated and fused; and respective pressure imposing elements, disposed between the corresponding lead terminals and respective short-circuiting plates, electrically connecting the central electrode to the respective short-circuiting plates and forcing the respective short-circuiting plates toward the corresponding outer edge metallized sections of the pair of insulating holders.

9. The lightning arrester as defined by claim 8, wherein each pressure creating element is a blade spring, provided in the respective short-circuiting plate and engaged with a corresponding lead terminal of the central electrode and forcing the respective short-circuiting plate toward the outer edge metallized section of the respective insulating holder.

10. A lightning arrester comprising:

a central electrode having a discharging section and a pair of lead terminals extending outwardly from respective, opposite ends of the discharging section for connection to a signal line, an outer diameter of each lead terminal of the central electrode being smaller than that of the discharging section;

a tubular outer electrode for connection to an earth line and having opposite ends and defining an interior space accommodating the central electrode therein; and a pair of insulating holders, the pair of lead terminals of the central electrode receiving therethrough respective lead terminals of the pair of lead terminals of the central electrode and supporting the central electrode in the interior space of the outer electrode and isolating the discharging section from the inner circumference of the outer electrode with a predetermined gap therebetween, the pair of lead terminals projecting outwardly from corresponding outside surfaces of the pair of insulating holders, respectively;

an outer edge metallized section provided on a peripheral edge of the corresponding outside surface of a selected insulating holder and electrically connected to the outer electrodes;

a short-circuiting plate arranged on the outside surface of the respective, selected said insulating holder;

a pressure imposing element, disposed between the lead terminal and the short-circuiting plate, electrically connecting the central electrode to the short-circuiting plate and forcing the short-circuiting plate toward the outer edge metallized section of the selected insulating holder;

a low-melting point metallic plate, arranged between the outer edge metallized section and the short-circuiting plate and in contact with one of the outer edge metallized section and the short-circuiting plate, electrically connecting the short-circuiting plate to the outer edge metallized section upon the low-melting point metallic plate being excessively heated and fused so that the central electrode is short-circuited with the outer electrode; and a heat-durable insulating sheet, arranged between the low-melting point metallic plate and the short-circuiting plate or between the outer edge metallized section and the low-melting point metallic plate, having a melting point higher than that of the low-melting point metallic plate and electrically insulating the central electrode from the outer electrode.

11. The lightning arrester as defined by claim 10, wherein the low-melting point metallic plate is made of solder.

12. The lightning arrester as defined by claim 10, wherein the pressure creating element is a blade spring, provided in the short-circuiting plate and engaged with a corresponding lead terminal of the central electrode and forcing the short-circuiting plate toward the outer edge metallized section of the selected insulating holder.

13. The lighting arrester as defined by claim 10, wherein respective outer edge metallized sections are provided on the corresponding peripheral edges of the outside surfaces of said pair of insulating holders and further comprising:

respective short-circuiting plates arranged on the corresponding outside surfaces of said pair of insulating holders;

respective pressure imposing elements, disposed between the lead terminals and the short-circuiting plates, electrically connecting the central electrode to the respective short-circuiting plates and forcing the short-circuiting plates toward the outer edge metallized sections of the respective insulating holders;

low-melting point metallic plates, arranged between the corresponding outer edge metallized sections and the respective short-circuiting plates and in contact with the outer edge metallized sections and the respective short-circuiting plates, electrically connecting the short-circuiting plates to the corresponding outer edge metallized section upon either of the respective low-melting point metallic plates being excessively heated and fused so that the central electrode is short-circuited with the outer electrode; and heat-durable insulating sheets, arranged between the respective low-melting point metallic plates and the corresponding short-circuiting plates or between the outer edge metallized sections and the respective low-melting point metallic plates, having a melting point higher than that of the low-melting point metallic plates and electrically insulating the central electrode from the outer electrode.

14. A lightning arrester comprising:

a central electrode having a discharging section and a pair of lead terminals extending outwardly from respective, opposite ends of the discharging section for connection to a signal line, an outer diameter of each lead terminal of the central electrode being smaller than that of the discharging section;

a tubular outer electrode for connection to an earth line and having opposite ends defining an interior space accommodating the central electrode therein;

a pair of insulating holders, the pair of lead terminals of the central electrode receiving therethrough respective lead terminals of the pair of lead terminals of the central electrode and supporting the central electrode in the interior space of the outer electrode and isolating the discharging section from the inner circumference of the outer electrode with a predetermined gap therebetween, the pair of lead terminals projecting outwardly from corresponding outside surfaces of the respective insulating holders;

an outer edge metallized section provided on a peripheral edge of the outside surface of a selected said insulating holder and electrically connected to the respective outer electrode;

a short-circuiting plate arranged on the outside surface of the respective, selected said insulating holder;

a pressure imposing element, disposed between the each lead terminal and the short-circuiting plate, electrically connecting the central electrode to the short-circuiting plate and forcing the short-circuiting plate toward the outer edge metallized section of the selected insulating holder; and a low-melting point metallic plate arranged between the outside surface of the insulating holder, on which no outer edge metallized section is provided, and the short-circuiting plate and in contact with the short-circuiting plate and electrically connect the short-circuiting plate to the outer edge metallized section when the low-melting point metallic plate is excessively heated and fused so that the central electrode is short-circuited to the outer electrode.

15. The lightning arrester as defined by claim 14, wherein the low-melting point metallic plate is made of solder.

16. The lightning arrester as defined by claim 14, wherein the pressure creating element is a blade spring, provided in the short-circuiting plate and engaged with a corresponding lead terminal of the central electrode, forcing the short-circuiting plate toward the outer edge metallized section of the selected insulating holder.

17. The lighting arrester as defined by claim 14, wherein respective outer edge metallized sections are provided on the corresponding peripheral edges of the outside surfaces of said pair of insulating holders and further comprising:

respective short-circuiting plates arranged on the corresponding outside surfaces of said pair of insulating holders;

respective pressure imposing elements, disposed between the each lead terminals and the short-circuiting plates, electrically connecting the central electrode to the respective short-circuiting plates and forcing the short-circuiting plates toward the outer edge metallized sections of the respective insulating holders; and low-melting point metallic plates arranged between the corresponding outside surfaces of the insulating holders, on which no outer edge metallized sections are provided, and the respective short-circuiting plates and in contact with the short-circuiting plates and electrically connecting the short-circuiting plates to the outer edge metallized sections when either of the respective low-melting point metallic plates is excessively heated and fused so that the central electrode is short-circuited to the outer electrode.

18. A lightning arrester comprising:

a central electrode having a discharging section and a pair of lead terminals extending outwardly from respective, opposite ends of the discharging section for connection to a signal line, an outer diameter of each lead terminal of the central electrode being smaller than that of the discharging section;

a tubular outer electrode for connection to an earth line and having opposite ends and defining an interior space accommodating the central electrode therein; and a pair of insulating holders, the pair of lead terminals of the central electrode receiving therethrough respective lead terminals of the pair of lead terminals of the central electrode and supporting the central electrode in the interior space of the outer electrode and isolating the discharging section from the inner circumference of the outer electrode with a predetermined gap therebetween, the pair of lead terminals projecting outwardly from corresponding outside surfaces of the pair of insulating holders, respectively;

an outer edge metallized section provided on a peripheral edge of the outside surface of a selected insulating holder and electrically connected to the outer electrode;

a short-circuiting plate, disposed on the outside surface of the insulating holder;

a pressure imposing element, disposed between the lead terminal and the short-circuiting plate, electrically connecting the central electrode to the short-circuiting plate and forcing the short-circuiting plate toward the outer edge metallized section of the selected insulating holder; and an insulating sheet having a plurality of small holes allowing a discharge between the outer edge metallized section and the short-circuiting plate when a voltage of or exceeding, a predetermined level is applied therebetween.

19. The lightning arrester as defined by claim 18, wherein respective conductive plates are disposed between the insulating sheet and the outer edge metallized section and between the insulating sheet and the short-circuiting plate.

20. The lightning arrester as defined by claim 18, wherein the pressure creating element is a blade spring, provided in the short-circuiting plate and engaged with a corresponding lead terminal of the central electrode, forcing the short-circuiting plate toward the outer edge metallized section of the selected insulating holder.

21. The lightning arrester as defined by claim 19, wherein at least one of the conductive plates is a low-melting point metallic plate which is fused, when excessively heated, and flows into the small holes, electrically connecting the short-circuiting plate to the outer edge metallized section so that the central electrode is short-circuited to the outer electrode.

22. The lightning arrester as defined by claim 21, wherein the low-melting point metallic plate is made of solder.

23. The lightning arrester as defined by claim 18, wherein respective outer edge metallized sections are provided on the corresponding peripheral edges of the outside surfaces of said pair of insulating holders and further comprising:

respective short-circuiting plates, disposed on the corresponding outside surfaces of said pair of insulating holder;

respective pressure imposing elements, disposed between the lead terminals and the short-circuiting plates, electrically connecting the central electrode to the respective short-circuiting plates and forcing the short-circuiting plates toward the outer edge metallized sections of the respective insulating holders; and a pair of insulating sheets, each having a plurality of small holes allowing a discharge between the corresponding outer edge metallized sections and the short-circuiting plates when a voltage of, or exceeding, a predetermined level is applied therebetween.

24. The lightning arrester as defined by claim 23, wherein respective conductive plates are disposed between the insulating sheets and the outer edge metallized sections and between the insulating sheets and the short-circuiting plates.

25. The lightning arrester as defined by claim 24, wherein each of the conductive plates is a low-melting point metallic plate which is fused, when excessively heated, and flows into the small holes, electrically connecting the short-circuiting plate to the outer edge metallized section so that the central electrode is short-circuited to the outer electrode.

26. A lightning arrester comprising:

a central electrode having a discharging section and a pair of lead terminals extending outwardly from respective, opposite ends of the discharging section, an outer diameter of each lead terminal of the central electrode being smaller than that of the discharging section;

a tubular outer electrode for connection to an earth line and having opposite ends defining an interior space accommodating the central electrode therein; and a pair of insulating holders, the pair of lead terminals of the central electrode receiving therethrough respective lead terminals of the pair of lead terminals of the central electrode and supporting the central electrode in the interior space of the outer electrode and isolating the discharging section from the inner circumference of the outer electrode with a predetermined gap therebetween, the pair of lead terminals projecting outwardly from corresponding outside surfaces of the pair of insulating holders, respectively, at least one of the lead terminals having a reduced diameter section, relatively to a remainder thereof, disposed within the interior space and subject to being fused when excessively heated.

* * * * *

UNITED STATES PATENT AND TRADEMARK OFFICE

CERTIFICATE OF CORRECTION

PATENT NO. : 5,790,362
DATED : August 4, 1998
INVENTOR(S) : Masataka KASAHARA et al.

It is certified that error appears in the above-identified patent and that said Letters Patent is hereby corrected as shown below:

Col. 1, line 12, change "are" to --is--.

Col. 5, line 40, after "respective" insert --,--.

Col. 6, line 17, delete "edge".

Col. 7, line 47, change "10" to --10a-- and change "10a" to --10--.

Signed and Sealed this

Twelfth Day of January, 1999

*Attest:*

*Attesting Officer*

*Acting Commissioner of Patents and Trademarks*